(12) United States Patent
Itoh

(10) Patent No.: US 7,208,194 B2
(45) Date of Patent: Apr. 24, 2007

(54) METHOD AND MACHINE FOR PRODUCING OPTICAL COMPENSATION SHEET

(75) Inventor: Hidetomo Itoh, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 524 days.

(21) Appl. No.: 10/434,179

(22) Filed: May 9, 2003

(65) Prior Publication Data

US 2003/0214059 A1  Nov. 20, 2003

(30) Foreign Application Priority Data

May 13, 2002  (JP) ............................. 2002-137667

(51) Int. Cl.
*B05D 5/06* (2006.01)

(52) U.S. Cl. .................. 427/162; 427/163.1; 427/164; 427/315; 427/316; 427/335; 427/355; 427/359; 427/368; 427/371; 427/377; 427/379; 427/384; 427/385.5; 427/412.1; 118/67; 118/68; 118/123; 349/75; 349/117

(58) Field of Classification Search ................ 427/162, 427/163.1, 164, 315, 316, 335, 355, 359, 427/368, 371, 377, 379, 384, 385.5, 412.1, 427/412.2; 349/75, 117; 118/67, 68, 123
See application file for complete search history.

(56) References Cited

U.S. PATENT DOCUMENTS

| | | | |
|---|---|---|---|
| 5,656,417 A * | 8/1997 | Endoh et al. ................ 430/502 |
| 5,853,801 A * | 12/1998 | Suga et al. .................. 427/164 |
| 6,894,751 B2 * | 5/2005 | Payne et al. ................. 349/117 |
| 2002/0027628 A1 * | 3/2002 | Ishizuka et al. ............. 349/118 |
| 2003/0068475 A1 * | 4/2003 | Ohbayashi et al. ......... 428/195 |

\* cited by examiner

*Primary Examiner*—Alain L. Bashore
(74) *Attorney, Agent, or Firm*—Young & Thompson

(57) ABSTRACT

A film sheet which has a polymer layer formed of a coating solution is drawn from a balk roll and transported toward a rubbing apparatus. Thereby, first and second blowers sequentially disposed respectively apply to the polymer layer an air of temperature 45±2° C. and humidity 50%–60%, and an air of temperature 25±1° C. and humidity 30%–35%. Thus, damages which occurred in transporting and rolling the film sheet are removed. Thereafter, a rubbing action is performed to the film sheet such that the polymer layer has alignment. Then a liquid crystal layer is formed on the polymer layer, to obtain an optical compensation film.

4 Claims, 3 Drawing Sheets

METHOD AND MACHINE FOR PRODUCING OPTICAL COMPENSATION SHEET

BACKGROUND OF THE INVENTION

1. Field of the Invention

The present invention relates to a method and a machine for producing an optical compensation sheet used for STN liquid crystal display, TFT liquid crystal display or OCB liquid crystal display.

2. Description Related to the Prior Art

A liquid crystal display is widely used, and the demand, of a polarizing filter and an optical compensation sheet used in the polarizing filter becomes higher. In a producing process of the optical compensation sheet, a polymer solution is applied onto a transparent polymer film sheet base, and dried thereafter to form a polymer layer. Thus the polymer film sheet base and the polymer layer construct a film sheet. Thereafter a rubbing action is performed to the film sheet to form the polymer layer into an alignment layer. Then, a solution containing liquid crystal is applied onto the alignment layer and dried to obtain the optical compensation sheet. All of these steps in the producing process are often made continuously. Otherwise, in accordance with maintenance of the product line and conditions, for example, for exchanging materials at each step, the film sheet is rolled to a sheet roll between forming and rubbing the polymer layer.

Recently, the many sorts of the optical compensation sheet are required. For example, it is necessary to optionally set the polarization axis to the transparent axis of the polarized filter. Further, it is required to make the cost of the optical compensation sheet lower.

The optical compensation film often has optical defects. The production efficiency depends on incidence of the alignment defects in the optical compensation sheet so much.

Usually, a continuous sheet type of the film sheet base is used to produce a continuous type of the optical compensation sheet. When a film sheet for the optical compensation sheet has an alignment defect, the liquid crystal is aligned inadequately, which causes irregular unevenness (or mura) in a formed image: Accordingly the defective part of the optical compensation sheet can be used in neither polarizing filter nor the liquid crystal display, and therefore, the defective part of the optical compensation sheet is abolished.

The main causes of the alignment defects in the optical compensation sheet are bad conditions of the film sheet in the rubbing action. There are four main reasons of the bad conditions. First, a guide roller for feeding the film sheet damages the polymer layer, when a surface of the guide roller is not enough smooth, or when there are foreign particles between the film sheet and the guide roller. Secondly, an excess force is applied to the film sheet in the sheet roll. As the film sheet is rolled into the sheet roll, part of the film sheet contacts another part thereof with high stress and slides each other to rub and damage the surface of the polymer layer. Such damages more often occur in the middle part of the film sheet in the sheet roll.

Thirdly, when a surface of a reel for the sheet roll is not enough smooth, then the reel damages a surface of a forward edge of the film sheet. While the film sheet is rolled around the reel, the reel contacts the surface of the forward edge. Fourthly, when being set on a surface of the reel, the forward edge forms a step on the reel, and the step often causes to damage contact part of the polymer layer that is to in contact with the forward edge of the film sheet. These defects are formed intermittently frequently almost when in producing the continuous type of the optical compensation sheet.

SUMMARY OF THE INVENTION

An object of the present invention is to provide a method and a machine for producing an optical compensation sheet including an alignment layer whose alignment is adequate.

In order to achieve the object and the other objects, in a method of the present invention, a first air is blown to a polymer layer in a continuous film sheet which is transported. The first air has a dry bulb temperature between 30° C. and 60° C. and relative humidity between 55% and 80%. After the first air is blown, a surface of the polymer layer is rubbed to form alignment for the polymer layer. Then a solution containing liquid crystal is cast onto the polymer layer having the alignment. A discharge of the first air is almost uniform in a widthwise direction of the film. The film may be drawn from a film roll before being transported.

Further, in the method of the invention, a second air is blown to the polymer layer between blowing the first air and rubbing the surface of the polymer layer. The second air has dry bulb temperature between 25° C. and 30° C. and relative humidity between 30% and 50%.

In a machine of the present invention, a continuous film is transported by a transporting means, and a first blower blows onto a polymer layer of the transported film a first air having dry bulb temperature between 30° C. and 60° C. and relative humidity between 55% and 80%. In the machine, a rubbing means is positioned downstream from the first blower, and rubs the polymer layer to form alignment for the polymer layer. Then liquid crystal forming means forms a liquid crystal layer on the polymer layer having the alignment, to obtain the optical compensation sheet.

Further, in the machine of the invention, a second blower is positioned between the first blower and the rubbing means, and blows to the polymer layer a second air having dry bulb temperature between 25° C. and 30° C. and relative humidity between 30% and 50%. A discharge of the first air is almost uniform in a widthwise direction of the film. The film may be drawn from a film roll before being transported.

Furthermore, the first and second blowers are provided with temperature/humidity controllers for controlling the dry bulb temperature and the relative humidity of the first and second air, respectively.

According to the invention, the first and second air remove damages on the polymer layer, which occurred in transporting and rolling the film sheet. Accordingly, the polymer layer can obtain adequate alignment through a rubbing action by the rubbing means. Thus the optical compensation sheet of high quality can be effectively produced.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1A:
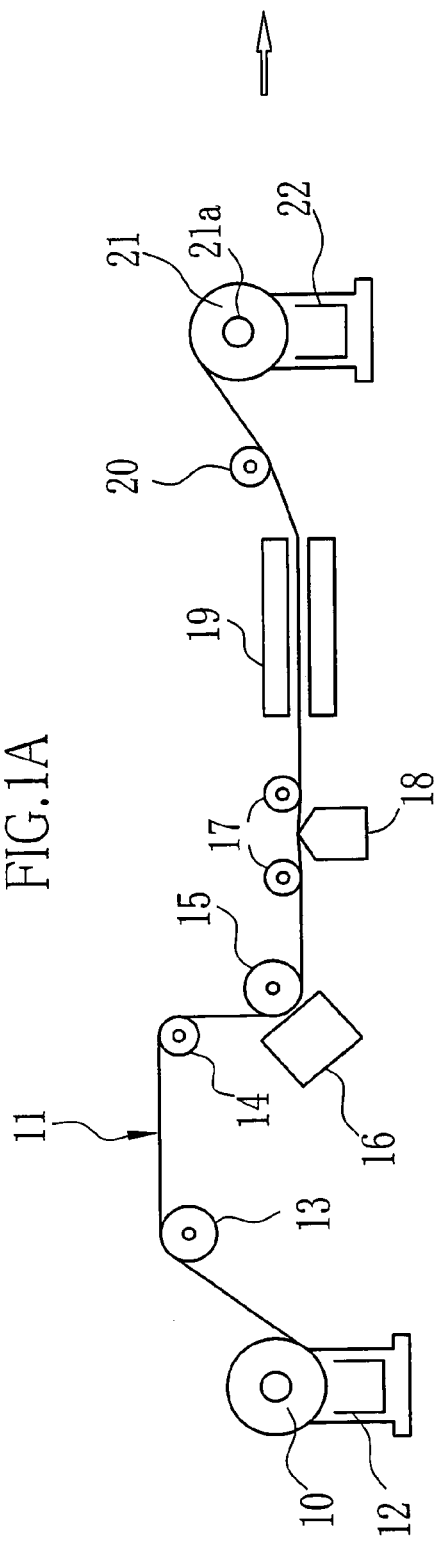
FIG. 1A is a schematic diagram illustrating steps until rolling a film sheet into a sheet roll in a producing process of an optical compensation film.

An example of a process for producing an optical compensation sheet 23 is explained with reference to FIGS. 1A and 1B. In FIG. 1A, a continuous film sheet 11 is drawn from a film roll 10 and fed by a film drawing apparatus 12 with guide of a drive roller 13 and a pass roller 14 to reach a first dust removing apparatus 16. At the first dust removing apparatus 16, a guide roller 15 supports the film sheet 11, and the first dust removing apparatus 16 removes dusts on a surface of the film sheet 11. Further, the film sheet 11 is fed to a coating apparatus 18. The coating apparatus 18 applies a coating solution containing polymers on the film sheet 11 supported by a back-up roller 17. While the film sheet 11 is, further fed, the coating solution is dried in a drying zone 19 so as to become a transparent polymer layer 11*b* (see FIG. 3) overlaid on a film sheet base 11*a* (see, FIGS. 2 and 3) in the film sheet 11. The film sheet 11 is guided with a guide roller 20, and rolled around a reel 21*a* into a sheet roll 21 with a rolling/drawing apparatus 22. Usually, plating is made with hard chromium on a surface of the guide roller 20 and the reel 21*a*. It is preferable that the surface is smooth and processed, for example, brushed, coated with resin or the like, such that foreign materials may be hardly adhered on the surface. Thus, damages on the surface of the polymer layer can be decreased.

Figure 1B:
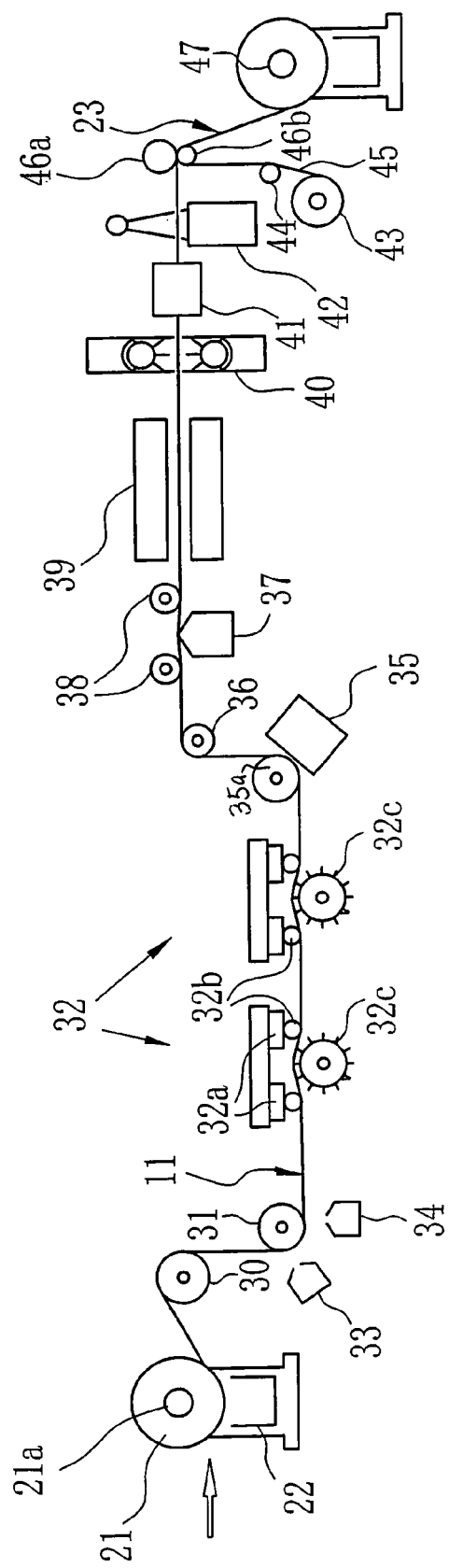
FIG. 1B is a schematic diagram illustrating, steps from drawing the film sheet from the sheet roll in the producing process of the optical compensation film.

In FIG. 1B, the film sheet 11 is drawn from the sheet roll 21 with the rolling/drawing apparatus 22, and guided with a drive roller 30 to confront a first blower 33 and a second blower 34. The first and second blowers 33, 34 are disposed close to the film sheet 11 supported on a guide roller 31, and blow respective first and second airs onto the polymer layer 11*b* of the film sheet 11 while the temperature and the humidity of the first and second airs are adjusted.

Thereafter, the film sheet 11 is further fed to a rubbing apparatus 32. The rubbing apparatus 32 includes a roller stage 32*a*, a guide roller 32*b* rotatably fixed on the roller stage 32*a* with a spring (not shown), and a rubbing roller 32*c*. The rubbing apparatus 32 performs a rubbing action to the polymer layer 11*b*. Thus the polymer layer 11*b* becomes an alignment layer 11*c* (see, FIG. 2). Then the film sheet 11 is fed to a dust removing apparatus 35. The dust removing apparatus 35 removes foreign materials on the film sheet 11 supported by a guide roller 35*a*. Then, the film sheet 11 is guided with the pass roller 36 to a coating apparatus 37.

The coating apparatus 37 applies a solution containing liquid crystal on the alignment layer 11*c* of the film sheet 11 supported by a back-up roller 38. The solution containing liquid crystal is dried, and then heated in a heating zone 39 to form a liquid crystal layer 11*d* (see, FIG. 2) on the alignment layer 11*c*. When the liquid crystal has at least one substituent which makes cross-linking in ultraviolet ray, then ultraviolet lamps 40 illuminates ultraviolet ray to make the cross-linking in the liquid crystal layer 11*d* of the film sheet 11, and thereafter the film sheet 11 is cooled in a cooler 41. It is preferable that the temperature of the film sheet 11 becomes lower in a short time. In this case, it is prevented to damage a nematic phase in the liquid crystal layer 11*d*. Otherwise, when the liquid crystal has none of the substituent for making cross-linking in the ultraviolet ray, then the illumination of the ultraviolet ray by the ultraviolet lamps 40 and the cooling by the cooler 41 are not necessary.

Optical property of the film sheet 11 having the liquid crystal layer 11*d* on the alignment layer 11*c* is estimated with an estimation apparatus 42. Thereafter, the liquid crystal layer 11*d* of the film sheet 11 is laminated with a protective film 45 by a laminating apparatus 46*a*, 46*b* to obtain an optical compensation sheet 23, while the protective film 45 is drawn from a film roll 43 and guided with a pass roller 44 to the laminating apparatus 46*a*, 46*b*. The optical compensation sheet 23 is rolled around a reel 47. It is to be noted that the numbers of the pass roller and the guide roller and the relative positions thereof to the film sheet is not restricted in the above embodiments.

Figure 2:
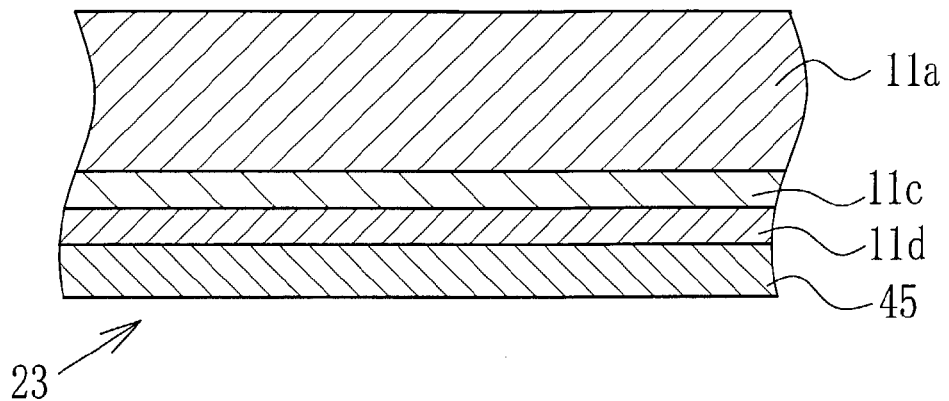
FIG. 2 is a sectional view of the first embodiment of the optical compensation film.

As shown in FIG. 2, the optical compensation sheet 23 has the film sheet base 11*a*, the alignment layer 11*c*, the liquid crystal layer 11*d* and the protective film 45. The alignment layer 11*c*, the liquid crystal layer 11*d* and the protective film 45 are overlaid on the film sheet base 11*a* in this order.

Figure 3:
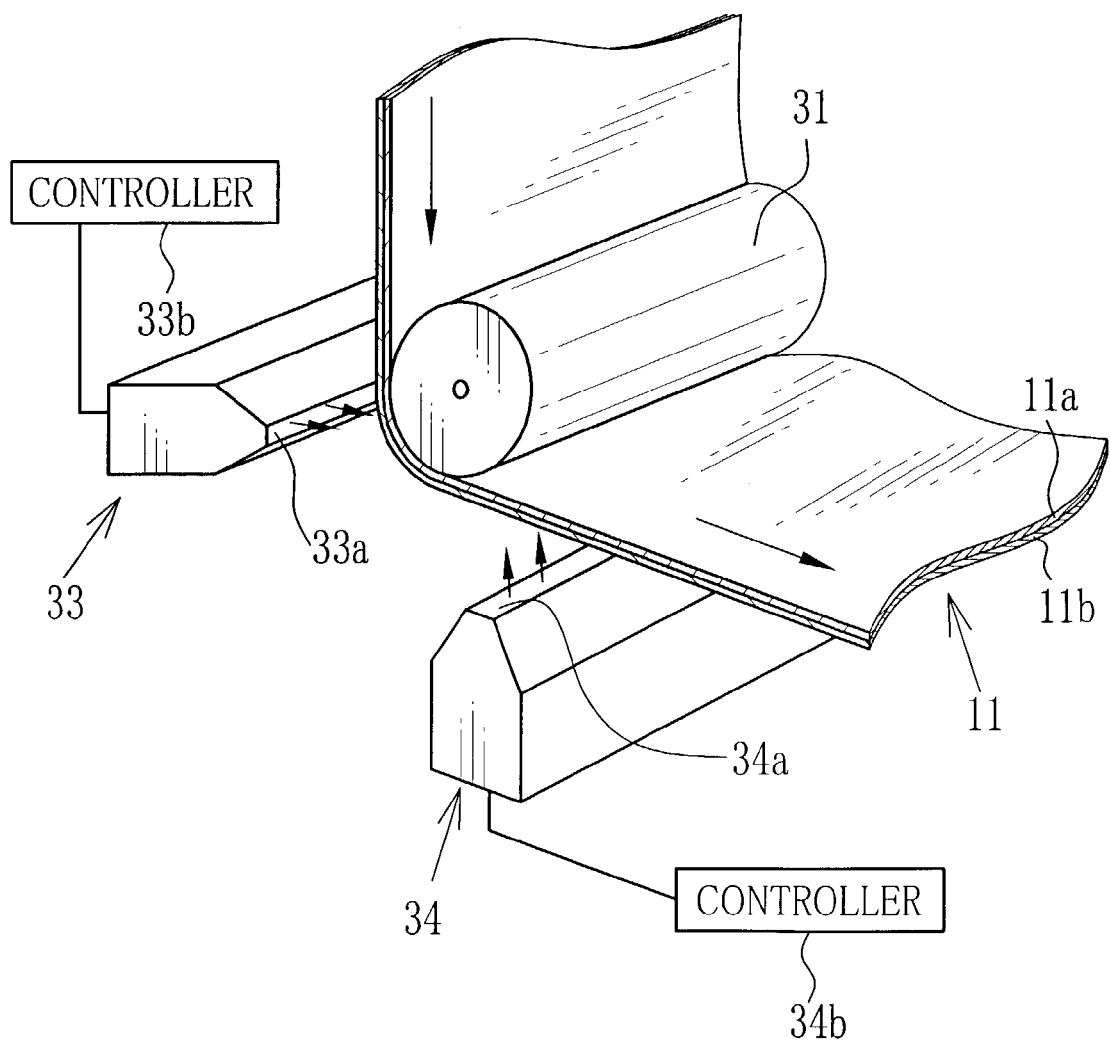
FIG. 3 is a perspective view illustrating a step of regulating a situation of a polymer layer in the film sheet to perform a rubbing action.

As shown in FIG. 3, after drawing the film sheet 11 from the sheet roll 21 and before rubbing the film sheet 11, the film sheet 11 is constructed of the film sheet base 11*a* and the polymer layer 11*b*. The first and second blowers 33, 34 have respective blow openings 33*a*, 34*a* for blowing the first and second airs constantly in a widthwise direction on the film sheet 11. However, the number, the size and the shape of blowers are not restricted in this embodiment. For example, the smaller blowers may be arranged in the widthwise direction of the film sheet 11 such that the first and second airs may be discharged adequately and almost uniformly in the widthwise direction. Further, the position and the direction of the first and second blowers 33, 34 are not restricted in FIG. 2. Namely, the first and second blowers 33, 34 may be disposed along a feeding path of the film sheet 11 before the rubbing apparatus 32, as far as the first and second blowers 33, 34 are directed such that the first and second airs are adequately discharged in the widthwise direction.

The first and second blowers 33, 34 are respectively provided with controllers 33*b*, 34*b* that independently controls the temperature and humidity of the first and second airs. Preferably, the first air blown by the first blower 33 has a dry bulb temperature 30–60° C. and a relative humidity 55%–80% to make processing in high temperature and high humidity. Further, the second air blown by the second blower 34 has a dry bulb temperature 20–30° C. and a relative humidity 30%–50% to make the drying. It is particularly preferable that the first air has a dry bulb temperature 40–50° C. and a relative humidity 45%–60%, and that the second air has a dry bulb temperature 25–30° C. and a relative humidity 30%–40%. It is especially preferable that the first air has a dry bulb temperature 45–50° C. and a relative humidity 50%–60%, and that the second air has a dry bulb temperature 25–27° C. and a relative humidity 30%–35%. Further, a speed of the first and second airs is preferably between 5 m/s and 30 m/s. Thus the film sheet 11 is dried enough in the second air from the second blower 34 after blowing the first air. It is to be noted that when the first blower 33 starts blowing the first air, then temperature of the polymer layer 11*b* of the film sheet 11 is preferably 25–30° C.

In the above embodiment, as the first and second airs are blown onto the polymer layer 11*b* of the film sheet 11, the condensation occurs in the surface of the polymer layer 11*b*. Accordingly, the condition of the surface of the polymer layer 11*b* is improved such that the surface of the film sheet 11 may lose no alignment which occurred when the film sheet 11 contacted to the guide rollers 20, 30, 31 and the like, and rolled up on the sheet roll 21.

When the alignment defects are sometimes not so much in the film sheet 11, then one of the first and second blowers 33, 34 may be driven. For example, when the optical compensation sheet 23 is produced in a condition of high temperature and low humidity, the second blower 34 may be omitted. In this case, the film sheet 11 may be fed to the rubbing apparatus 32 after the first blower 33 has blown the first air of high temperature and high humidity without blowing air of room temperature and low humidity. In the present invention, the temperature, humidity, air flow rate, air speed and the like of the air can be set in accordance with the surface temperature of the film sheet 11, the temperature and the humidity in environment, and the like.

In the method for producing the optical compensation sheet of the present invention, the property of the film sheet 11 may be estimated every time after each step, and the method of the estimation is selected adequately. In the above embodiment, the estimation apparatus 42 is used for estimating the property of the film sheet 11. The estimation apparatus 42 is constructed of a light source and a CCD camera (not shown). The CCD camera is disposed so as to confront to the liquid crystal layer 11d of the film sheet 11, and the light source is disposed symmetrically with the film sheet 11 to the CCD camera. In the estimation, the film sheet 11 is disposed between two elements of a cross-nicol polarizing filter. The light source irradiates a light. The situations of transmittance of the light are observed with the CCD camera continuously. When the transmittance is more than a predetermined value, then it is determined that the film sheet 11 has the alignment defect.

In the present invention, the coating solutions used for forming the polymer layer 11b or the alignment layer 11c may be already known. However, it is preferable that the polymer for the coating solution contains only a small amount of ionic impurities to be highly pure. When the optical compensation sheet 23 is set in an external electric field, then the alignment polarization of polymers, main component in the alignment layer 11c, occurs, and further the ionic impurities in the liquid crystal and the alignment layer 11c are polarized. After removing the external electrical field, the alignment polarization and the ionic polarization maintain the internal electric field. When the smaller amount of the ionic impurities is contained, the internal electric field therefore hardly remains. Accordingly, it is prevented to generate current, and the problems in image persistence on a display and the like do not occur easily.

As polymers for the polymer layer 11b (or the alignment layer 11c), there are, for example, polymethyl methacrylate (PMMA), acrylic acid/methacrylic acid copolymer, styrene/malein imide copolymer, polyvinyl alcohol (PVA), poly (N-methylol acrylamide), styrene/vinyl toluene copolymer, polyethylene chlorosulphonate, nitrocellulose, poly vinylchloride (PVC), chlorinated polyolefine, polyesters, polyimide (PI), vinyl acetate/vinyl chloride copolymer, ethylene/vinyl acetate copolymer, carboxy methylcellulose, polyethylene, polypropylene, polycarbonate (PC) and the like. Preferable are long alkyl chain denatured polyvinyl alcohol, polyimide, polystyrene, polystyrene derivatives, gelatin, and the like. The solution of polyamic acid, prepolymer of polyimide, can be used for the coating solution for the polymer layer 11b in order that the polymer layer 11b contains the polyimide. When the solution of polyamic acid is heated and dried, then the cross-linking occurs to obtain the polymer layer 11b containing polyimide.

In the method for producing the optical compensation film of the present invention, several films made of resin that are already known can be used as the film sheet base 11a. It is preferable that optical transmittance of the film sheet base 11a is more than 80%, and that the film sheet base 11a has optical isotropy in accordance with the surface thereof, namely the natural birefringence of the film sheet base 11a is low. However, when the natural birefringence of the film sheet base 11a is relatively large, then it is designated to set the adequate conditions for forming and tensioning the film sheet base 11a.

Several plastic films that are already known may be used as the film sheet base 11a. The film sheet base 11a is made of, for example, polyethylene telephthalate (PET), polyethylene-2,6-naphthalate (PEN), cellulose diacetate (DAC), cellulose triacetate (TAC), cellulose acetate propionate, polyvinyl chloride (PVC), polyvinylidene chloride, PI, polyamide (PA), PC, polyallylate, polysulfone (PSf), polyethersulfone (PES), and the like. Further, the film sheet base 11a may be made of α-polyolefines containing 2–10 carbons, for example, polyethylene (PE), polypropylene (PP), ethylene butene copolymer and the like. Furthermore, the film sheet base 11a may have a multi-layer structure constructed of plural layers made of above materials.

Figure 4:
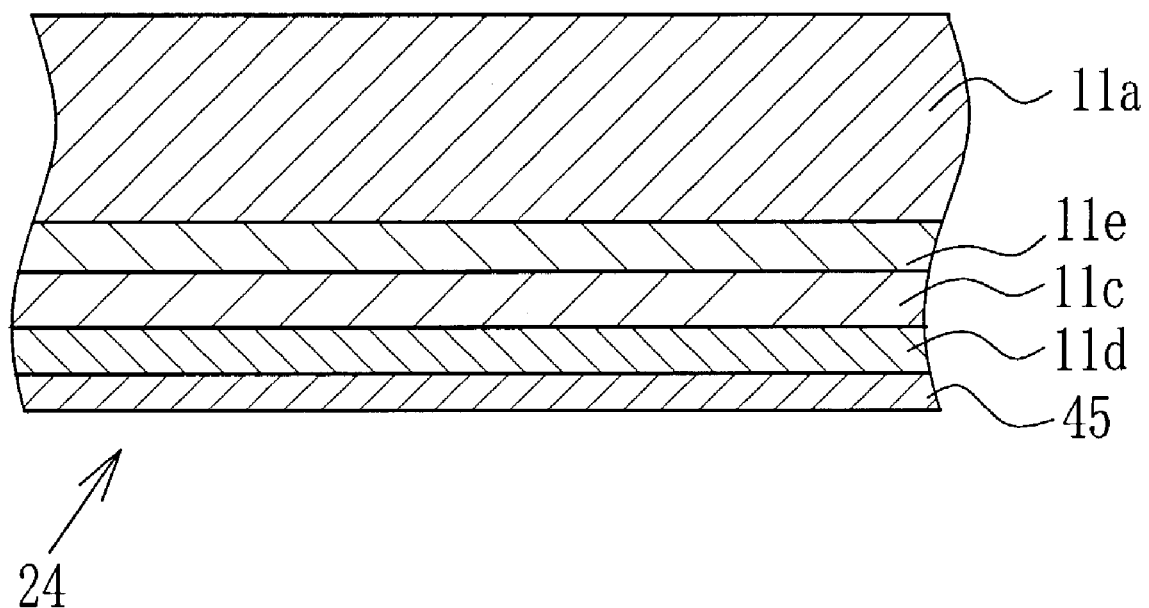
FIG. 4 is a sectional view of the second embodiment of the optical compensation sheet.

As shown in FIG. 4, an optical compensation sheet 24 has an undercoat layer 11e between the film sheet base 11a and the alignment layer 11c. The undercoat layer 11e is formed before applying the coating solution for the polymer layer 11b (or alignment layer 11c) on the film sheet base 11a, in order to firmly form the polymer layer 11b or the alignment layer 11c. Concretely, in this case, the coating solution for the polymer layer 11b is applied on the undercoat layer 11e in a good situation, and the polymer layer 11b is firmly formed on the film sheet base 11a through the undercoat layer 11e. In order to form the undercoat layer 11e, a solution therefor is cast or sprayed on the film sheet base 11a, or the film sheet base 11a is dipped in the solution. Thereafter, there are further drying sections and the like, and the adequate method is selected. As the solution for the undercoat layer 11e, there are gelatin solution or the polyvinyl alcohol solution and the like. It is to be noted that other structure of the optical compensation sheet 24 is the same as that of the optical compensation sheet 23 illustrated in FIG. 2. Accordingly, the explanation therefore is omitted.

In the producing method of the present invention, the rubbing action may be made in methods already known. The alignment may be obtained in a mechanical action alignment which is most usually made, or an optical alignment action in illumination of deflected ultraviolet ray. This optical action effectively makes quality of the product better, as the static electricity is not generated so much and the smaller amount of the dusts is observed. In the mechanical alignment action, cloths for rubbing action are used. The rubbing cloths are sheet like materials made of rubber, nylon, polyester and the like, otherwise are paper, felt and the like. The relative velocity of the rubbing cloth to the surface of the polymer layer 11b is preferably 50–1000 m/min, particularly 100–500 m/min.

In the present invention, several sorts of liquid crystal already known may be used. In the above embodiment, solution containing discotic liquid crystal and organic solvent is cast on the alignment layer 11c of the film sheet 11, and dried. Then the liquid crystal layer 11d of the discotic liquid crystal is heated in the heating zone 39 to the temperature for forming a discotic nematic phase, and thereafter cooled down to obtain optical anisotropy. The solution containing liquid crystal for the liquid crystal layer 11*d* contains not only the liquid crystal but also other additives, such as photopolymerization initiator and the like. The temperature in the heating zone 39 is set in accordance with the temperature of phase transition between liquid crystal and solid.

The following Experiment was made in the present invention. In the Experiment were used Examples and Comparisons of the optical compensation sheets that were produced in several conditions. The Examination about Example 1 is explained in detail, and the same Explanations are omitted in the other Examples and Comparisons. Note that the present invention is not restricted in it.

EXAMPLE 1

Cellulose triacetate (Fujitack, trade mark, produced by Fuji Photo Film Co. Ltd.) was used as the film sheet base 11*a*. The main content of the coating solution for the polymer layer 11*b* was straight chain alkyl denatured polyvinyl alcohol (MP203, trade mark, produced by Kuraray Co. Ltd.), and water was used as the solvent of the coating solution. After forming the polymer layer 11*b* from the coating solution, the film sheet 11 was rolled around the reel 21*a* to the sheet roll 21. Then the film sheet 11 was drawn from the sheet roll 21, and the first and second blowers 33, 34 were driven to blow the respective first and second airs to the process sheet of the film sheet 11 in the feeding path before the rubbing apparatuses 32. The temperature of the surface of the film sheet 11 was 25±1° C. The first air from the first blower 33 was set to have the dry bulb temperature of 45±2° C. and the relative humidity between 50% and 60%. The second air from the second blower 34 was set to have the dry bulb temperature of 25±1° C. and the relative humidity between 30% and 35%. Thereafter, the rubbing action was made to the film sheet 11. Thereby the peripheral speed of the rubbing rollers 32*c* was 8 m/s, and the film sheet 11 was tensioned in the lengthwise direction. The total tension therefor is 300 N throughout the width of the film sheet 11.

After rubbing action, the film sheet 11 was coated with the solution containing liquid crystal at the coating apparatus 37. Solvent of the solution containing liquid crystal was methylethylketone. In the solvent was solved a mixture of discotic LC compound and photopolymerization initiator (Irgacure 907, trade mark, produced by Ciba-Geigy Corporation), while the photopolymerization initiator is contained at 1 wt. % to the discotic LC compound. The concentration of the solution containing liquid crystal is 10 wt. %. The solution containing liquid crystal was cast on the film sheet 11 so as to have wet thickness of 4 μm, while the film sheet was fed at a feeding speed of 25 m/min. Then the film sheet 11 was transported through the heating zone 30 in which the temperature was set to 130° C. Thereafter, an ultraviolet ray was irradiated with the ultraviolet lamp 40 (600 W/cm² metal halide lamp, trade mark, produced by Eyegraphics Co. Ltd.) onto the liquid crystal layer 11*d* formed from the solution containing liquid crystal, so as to perform the crosslinking. The film sheet 11 provided with the alignment layer 11*c* and the liquid crystal layer 11*d* was estimated with the estimation apparatus 42 (alignment defective inspector, trade mark and type, produced by Futec Inc.). After the estimation, the protective film was laminated on the liquid crystal layer 11*d* to obtain Example 1 of the optical compensation sheet 23, and 1500 m thereof was rolled. In the estimation for Example 1, there were no alignment defects caused by contact to the guide roller 30, by contact with a step of the forward edge on the reel 21*a*, and by an excess force in the sheet roll 21.

EXAMPLE 2

In order to prepare Example 2, the first air from the first blower 33 was set to have the dry bulb temperature of 45±2° C. and the relative humidity between 50% and 60%, and the second air from the second blower 34 was not blown. Other conditions were the same as in Example 1. In the estimation for Example 2, there were no alignment defects caused by contact with the guide roller 30, by contact on the step of the forward edge on the reel 21*a*, and by the excess force in the sheet roll 21.

EXAMPLE 3

In order to prepare Example 3, the film sheet 11 provided with the polymer layer 11*b* is not rolled onto the sheet roll 21, and transported to the first and second blowers 33, 34 and the rubbing apparatus, sequentially. The first air, from the first blower 33 was set to have the dry bulb temperature of 45±2° C. and the relative humidity between 50% and 60%, and the first air from the second blower 34 was not blown. Other conditions were the same as in Example 1. In the estimation for Example 3, there were no alignment defects caused by contact with the guide roller 30.

[Comparison 1]

Comparison 1 is produced without blowing the first and second airs with the first and second blowers 33, 34 and rolling onto the sheet roll 21. Other conditions were the same as in Example 1. Namely, the film sheet 11, without being rolled onto the sheet roll, is directly transported to the rubbing apparatus 32 with guidance by the guide rollers, after the coating solution is cast on the film sheet base 11*a*. In the estimation for Comparison 1, the alignment defects caused by contact with the guide roller 30 were observed in the entire film sheet 11.

[Comparison 2]

Comparison 2 is produced without blowing the first and second airs with the first and second blowers 33, 34. Other conditions are the same as in Example 1. In the estimation for Comparison 2, the alignment defects caused by contact with the guide roller 30 were sometimes observed over the film sheet 11. Further, the alignment defects caused by the excess force in the sheet roll 21 were observed about 200 m–700 m from a forward edge of the film sheet 11 for contacting on the reel 21*a*. Furthermore, the alignment defects caused by the step of the contact end on the reel were observed about 30 m from the film sheet end. There were alignment defects caused by contact of the step of the forward edge on the reel 21*a*.

Various changes and modifications are possible in the present invention and may be understood to be within the present invention.

What is claimed is:

1. A method for producing an optical compensation sheet from a continuous film, which is constructed of a transparent film base and a transparent polymer layer formed on said film base, comprising steps of:
    (a) transporting said film base;
    (b) blowing a first air onto said polymer layer on said film base while transporting said film, said first air having a dry bulb temperature of 30–60° C. and a relative humidity of 55–80%;

(c) blowing a second air onto said polymer layer after step (b), said second air having a dry bulb temperature of 20–30° C. and a relative humidity of 30–50%;

(d) rubbing a surface of said polymer layer to form alignment on said polymer layer after step (c); and (e) coating said polymer layer with a solution containing liquid crystal after step (d), so as to obtain said optical compensation sheet.

2. The method as claimed in claim 1, wherein said first air has a dry bulb temperature of 40–50° C. and a relative humidity of 45–60%, and said second air has a dry bulb temperature of 25–30° C. and a relative humidity of 30–40%.

3. The method as claimed in claim 1, wherein said first air has a dry bulb temperature of 45–50° C. and a relative humidity of 50–60%, and said second air has a dry bulb temperature of 25–27° C. and a relative humidity of 30–35%.

4. The method as claimed in claim 1, wherein said first and second airs have a speed of 5–30 m/s.

* * * * *